US008624742B2

(12) United States Patent
Raju

(10) Patent No.: US 8,624,742 B2
(45) Date of Patent: Jan. 7, 2014

(54) APPARATUS AND METHOD FOR MONITORING KEYBOARD INPUT

(75) Inventor: Venkatesh Raju, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 393 days.

(21) Appl. No.: 13/043,929

(22) Filed: Mar. 9, 2011

(65) Prior Publication Data

US 2012/0229281 A1 Sep. 13, 2012

(51) Int. Cl.
*G08B 23/00* (2006.01)
*G06F 3/02* (2006.01)

(52) U.S. Cl.
USPC .............. 340/573.1; 340/309.16; 340/693.5; 340/540; 345/169

(58) Field of Classification Search
USPC ............. 340/573.1, 670, 457, 547.4, 309.16, 340/571, 540, 693.5, 309.7, 457.2, 407.2, 340/384.1; 705/9, 10; 400/472; 345/169, 345/173, 174, 178; 359/461; 361/679.56, 361/679.08

See application file for complete search history.

(56) References Cited

U.S. PATENT DOCUMENTS

| 6,736,559 | B2 * | 5/2004 | Larkin et al. .................. 400/472 |
| 2006/0093998 | A1 * | 5/2006 | Vertegaal ...................... 434/236 |
| 2009/0030767 | A1 * | 1/2009 | Morris et al. ..................... 705/9 |
| 2012/0039650 | A1 * | 2/2012 | Cvek ............................. 400/472 |

* cited by examiner

*Primary Examiner* — Anh V La
(74) *Attorney, Agent, or Firm* — Jefferson IP Law, LLP

(57) ABSTRACT

An apparatus and method for monitoring keyboard input are provided. The method includes monitoring input from the user over a predetermined interval, determining whether the amount of input over the predetermined interval has exceeded a predetermined threshold, and transmitting a warning to the user when the amount of input over the predetermined interval has exceeded the predetermined threshold.

17 Claims, 2 Drawing Sheets

APPARATUS AND METHOD FOR MONITORING KEYBOARD INPUT

BACKGROUND OF THE INVENTION

1. Field of the Invention

The present invention relates to an apparatus and method for monitoring keyboard input. More particularly, the present invention relates to an apparatus and method for monitoring keyboard input to detect and prevent potential injury.

2. Description of the Related Art

Mobile terminals were developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

For example, mobile phones are now equipped to transmit text messages. Text messaging, or "texting", has seen explosive growth in the last decade, with over 5.5 trillion short messages (SMS) sent in 2009 and over 6.6 trillion in 2010. The popularity of texting is in particular due to the speed with which users can type and send these short messages. This is especially true of teenage users who have adapted to the small keyboard of mobile phones and use only their thumbs to type messages at incredible speeds. Combined with very low cost messaging fees or SMS packages offering thousands or unlimited messages a month for a fixed fee, texting has become the medium of choice for teenagers. A 2009 study in the US found teens sending an average of 1700 text messages a month, and a more recent report by Nielsen puts it at 10 messages per hour during the day (over 3000 per month).

The overindulgence of texting by teens has exposed the risks of this activity—particularly the repetitive stress caused to the thumbs and wrists. In the US several teens have been diagnosed with thumb injuries due to excessive texting, a condition now being referred to as Teen Texting Tendonitis (TTT). In the United Kingdom, mobile operator Virgin Mobile has recognized this as a serious issue and has gone so far as to set up an informational website to inform users about the dangers of excessive texting. Accordingly, there is a need for an apparatus and method to monitor typing activity in order to warn users of excessive typing.

SUMMARY OF THE INVENTION

An aspect of the present invention is to address at least the above-mentioned problems and/or disadvantages and to provide at least the advantages described below. Accordingly, an aspect of the present invention is to provide an apparatus and method for monitoring keyboard input and informing a user of excessive typing.

In accordance with an aspect of the present invention, a method for providing a user interface in a mobile terminal having a software mode and a hardware mode is provided. The method includes monitoring input from the user over a predetermined interval, determining whether the amount of input over the predetermined interval has exceeded a predetermined threshold, and transmitting a warning to the user when the amount of input over the predetermined interval has exceeded the predetermined threshold.

In accordance with another aspect of the present invention, an apparatus is provided. The apparatus includes a keyboard for receiving user input, a keyboard controller for receiving the key input from the keyboard, a text application for receiving the key input from the keyboard controller and for performing predetermined actions based on the key input, an alarm monitor for monitoring input received from at least one of the keyboard controller and the text application over a predetermined interval, for determining whether the amount of input over the predetermined interval has exceeded a predetermined threshold, and for transmitting a warning to the user when the amount of input over the predetermined interval has exceeded the predetermined threshold, and a display unit for displaying a user interface of the text application and for displaying the warning when the warning is a message to be displayed on the display unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The following exemplary embodiments of the present invention are described as applied to a "mobile terminal" However, it is to be understood that this is merely a generic term and that the invention is equally applicable to any of a mobile phone, a palm sized Personal Computer (PC), a Personal Digital Assistant (PDA), a Hand-held PC (HPC), a smart phone, an International Mobile Telecommunication 2000 (IMT-2000) terminal, a wireless Local Area Network (LAN) terminal, and the like. Accordingly, use of the term "mobile terminal" should not be used to limit application of the present inventive concepts to any certain type of apparatus or device.

Exemplary embodiments of the present invention include an apparatus and method for monitoring keyboard input. If an excessive amount of keyboard input is detected, a notification is transmitted to the user. If the excessive keyboard input continues, operation of the keyboard may be temporarily suspended in order to limit the possibility of repetitive stress injury due to excessive typing.

Figure 1:
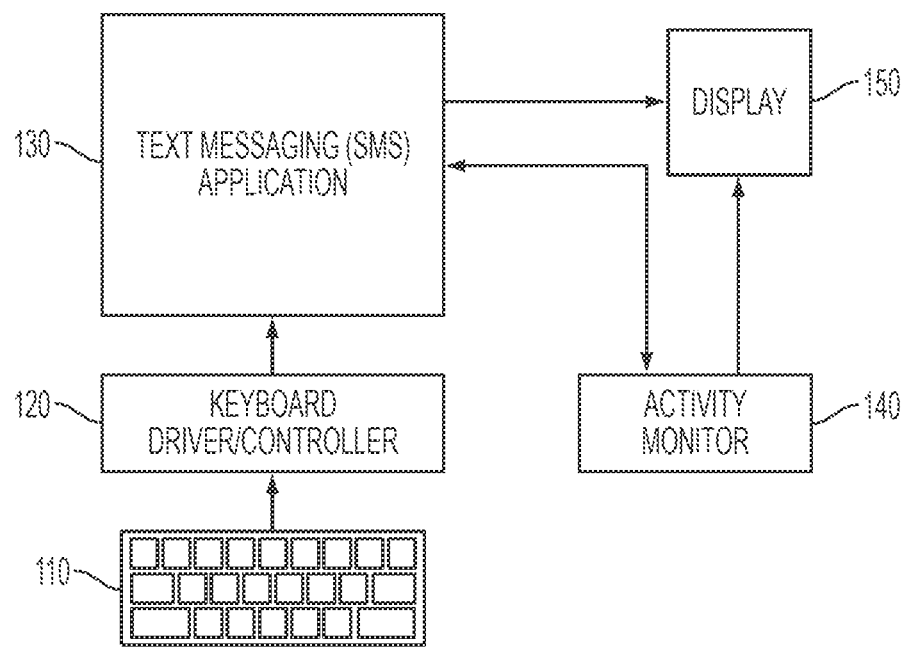
FIG. 1 is a diagram of an apparatus for monitoring keyboard input according to an exemplary embodiment of the present invention.

FIG. 1 is a diagram of an apparatus for monitoring keyboard input according to an exemplary embodiment of the present invention.

Referring to FIG. 1, the apparatus includes a keyboard 110, a keyboard controller 120, a text application 130, an activity monitor 140, and a display unit 150. The apparatus may be, for example, a mobile terminal, but exemplary embodiments of the present invention are not limited to mobile terminals. For example, the apparatus may be a desktop computer or laptop computer.

While the apparatus is understood to be a hardware device, the various components of the apparatus may be implemented as either hardware components or software components, where appropriate. While some components may be understood as capable of being implemented as both software and hardware, other components would be understood as necessitating at least a partial hardware implementation, as discussed below. The software components are also understood as being stored on a memory (not shown) and executed by a microprocessor (not shown).

The keyboard 110 accepts key input from the user. The keyboard 110 may be implemented as a physical keyboard, either as an integrated component (such as a keyboard incorporated in some PDAs) or as a separate peripheral. The keyboard may also be implemented as a "soft" keyboard, in which the keyboard is displayed on a touch-sensitive display (touchscreen) and key input is received through the touchscreen.

Key input from the keyboard 110 is processed by the keyboard controller 120. The keyboard controller passes the key input to the text application 130 and the activity monitor 140. According to exemplary embodiments of the present invention, the text application 130 may also transmit information to the alarm monitor 140. For example, whenever the text application 130 transmits a text message, the text application 130 may transmit information to the alarm monitor 140 indicating that a text message has been sent.

The text application 130 is described herein as a text messaging application, but the text application may be any application that receives a stream of text input. Exemplary embodiments of the present invention may be applied to any application in which a significant amount of text input is expected. Exemplary text applications include a text messaging application, a word processor, an instant messaging application, blogging applications, social networking applications, and the like.

The activity monitor 140 monitors the key input received from the keyboard controller 120 and issues warnings when text input over a predetermined interval exceeds a pre-defined threshold. When the activity monitor detects text input exceeding the pre-defined threshold, the activity monitor transmits a warning to the text messaging application 130 or to another application, or displays a warning on the display unit 150. The warning may be an audio or visual warning. The warning indicates that the user has been typing at an excessive rate and that injury may result if the user continues to type at the current rate.

Once the predetermined threshold is reached, the alarm monitor 140 also enters into a warning state. As long as the user continues to type at a speed above the predetermined threshold, the alarm monitor 140 will remain in the warning state and periodically issue additional warnings. The additional warnings may increase in urgency as more warnings are issued.

The alarm monitor 140 may exit the warning state if the amount of key input over the predetermined interval does not exceed the pre-defined threshold. For example, if the predetermined interval is one minute and the pre-defined threshold is 60 characters, when the alarm monitor 140 enters the warning state, the alarm monitor 140 may continue monitoring key input and may exit the warning state after one minute passes in which fewer than 60 characters were input. Alternatively, a different interval may be defined for exiting the warning state.

If the user ignores a predetermined number of warnings, the alarm monitor 140 may issue a critical alert. The alarm monitor 140 may issue the critical alert in the same fashion as the warning, or the critical alert may be issued in a different fashion. For example, the alarm monitor may display a warning message on the display unit 150 when issuing the warning, and both display a message and output an alert sound when issuing the critical alert.

When issuing the critical alert, the alarm monitor 140 may also suspend key input for a predetermined time and notify the user of the suspension of key input. The notification can include an indication of when key input will resume. While key input is suspended, the text application 130 will not respond to key input. For this purpose, the alarm monitor 140 may request the keyboard controller 120 not to send key input to the text application 130, or the alarm monitor 140 may directly request the text application 130 not to respond to key input received from the keyboard controller 120. If the keyboard 110 is a soft keyboard, the alarm monitor may also transmit a message to the keyboard 110 indicating that the keyboard 110 should not be displayed on the touchscreen while key input is suspended.

The threshold may be set in any of a variety of manners. In addition, multiple thresholds can be set to monitor both short-term and long-term behavior. For example, to monitor short-term behavior, the activity monitor may set a threshold of 60 characters over one minute. Using this threshold, the alarm monitor will transmit a warning if the user inputs more than 60 characters in a one minute time interval. The time interval is rolling; the duration is fixed (one minute) while the start and end times continuously advance. Similarly, to measure long-term behavior, the alarm monitor may set a threshold of 600 characters over one hour.

The two thresholds may be used separately or in combination. For example, if only short term behavior is to be tracked, the alarm monitor 140 will only measure key input against the short term threshold. If the two thresholds are used in combination, then the alarm monitor 140 will measure key input against both thresholds.

The display unit 150 may be provided as a Liquid Crystal Display (LCD). In this case, the display unit 150 may include a controller for controlling the LCD, a video memory in which image data is stored and an LCD element. If the LCD is provided as a touch screen, the display unit 150 may perform a part or all of the functions of the keyboard 110. The keyboard 110 may be a soft keyboard displayed on the display unit 150; the user inputs key input by touching a corresponding area of the display unit 150.

Figure 2:
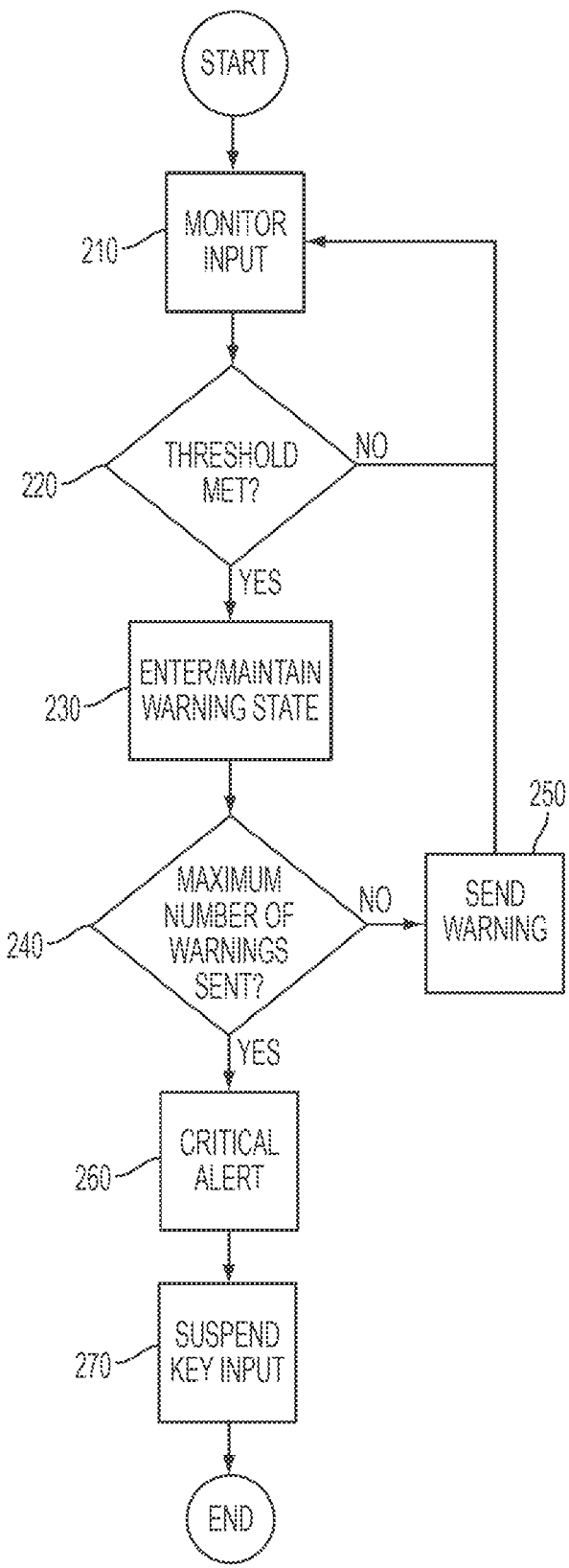
FIG. 2 is a flowchart of a method of monitoring keyboard input according to an exemplary embodiment of the present invention.

FIG. 2 is a flowchart of a method of monitoring keyboard input according to an exemplary embodiment of the present invention.

Referring to FIG. 2, the alarm monitor monitors input from the user in step 210 over a predetermined interval. The alarm monitor 140 may monitor the input by receiving information about key inputs received from the keyboard controller 120, or may monitor the input by receiving information of messages sent from the text application 130.

In some cases, the alarm monitor 140 may ignore or disregard input from the user. For example, if the alarm monitor 140 is monitoring input from a web browser, the alarm monitor 140 may only monitor text that is input to a text field of a web page being displayed on the web browser, while ignoring text input to other fields, such as a web address field. Similarly, the alarm monitor 140 may disregard input to applications other than the text application 130. These other applications may include a phone book, dialer, calendar, music player, video player, and the like.

In step 220, the alarm monitor 140 determines whether a predetermined threshold has been met. The predetermined threshold may be, for example, sixty key inputs received during the predetermined interval. Alternatively, the alarm monitor 140 may determine whether one of a plurality of thresholds has been met corresponding to different predetermined intervals. Such a comparison may be useful where the alarm monitor 140 is to monitor both short-term use (e.g., sixty key inputs per minute) and long-term use (e.g., six hundred key inputs per hour). In this case, the alarm monitor will compare input received over a first predetermined interval against a first threshold, and compare input received over a second predetermined interval against a second threshold.

If the predetermined threshold has not been met, the alarm monitor continues to monitor key input in step 210. If the alarm monitor is in the warning state, the alarm monitor may exit the warning state once the rate of input falls below the predetermined threshold during the predetermined interval.

If the predetermined threshold has been met, the alarm monitor 140 enters the warning state in step 230. If the alarm monitor 140 is already in the warning state, the alarm monitor 140 maintains the warning state in step 230.

In step 240, the alarm monitor 140 determines whether a maximum number of allowed warnings have been sent. If the maximum number of warnings has not been sent, the alarm monitor transmits a warning in step 250. The warning may be, for example, an audible warning, such as a beep, or a visual warning, such as a message on the display unit 150. The nature of the warning may depend on the number of warnings that have been previously sent. For example, the warnings may increase in urgency; the first warning may be merely an audible warning, while successive warnings may include messages of increasing urgency indicating that hand injury may occur if input continues at the current rate. The alarm monitor 140 then returns to monitoring input at step 210.

If the maximum number of warnings has been sent, the alarm monitor 140 transmits a critical alert in step 260, and suspends key input for a predetermined time in step 270. The alarm monitor 140 displays a message indicating that key input has been suspended. The alarm monitor may also display a message indicating when the suspension of key input will end. Although not shown in FIG. 2, when suspension of key input ends, the alarm monitor 140 may exit the warning state and restart monitoring in step 210.

In some cases, the alarm monitor 140 may permit text input even while text input may be suspended. For example, the alarm monitor may allow the user to type and send messages to emergency numbers, such as 911 in the United States. Moreover, the suspension of input may be limited to suspension of text input. The alarm monitor 140 may still permit the user to navigate to and use other applications that do not promote excessive use of text input, such as phone book and contact applications, music players, video players, and the like.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for warning a user of potential injury due to excessive text input, the method comprising:
   monitoring input from the user over a plurality of predetermined intervals;
   determining whether the amount of input over one or more of the plurality of predetermined interval has exceeded a corresponding one of a plurality of predetermined thresholds; and
   transmitting a warning to the user when the amount of input over the one or more predetermined intervals has exceeded the corresponding predetermined threshold.

2. The method of claim 1, wherein the input comprises at least one of:
   key input to a keyboard; and
   a message transmitted from a messaging application.

3. The method of claim 1, wherein the plurality of intervals comprises a first interval of one minute and a second interval of one hour, and
   wherein the plurality of thresholds comprises a first threshold of sixty characters corresponding to the first interval and a second threshold of six hundred characters corresponding to the second interval.

4. The method of claim 1, further comprising:
   when the amount of input over the one or more predetermined intervals has exceeded the corresponding predetermined threshold, entering into a warning state; and
   when a predetermined number of warnings has been sent while in the warning state, transmitting a critical alert and suspending an ability of the user to enter input for a predetermined time period.

5. The method of claim 4, wherein the transmitting of the critical alert comprises:
   displaying a message to the user indicating that the ability to enter input has been suspended and when the suspension of the ability to enter input will end.

6. The method of claim 4, further comprising:
exiting the warning state when the corresponding predetermined threshold is not met during the one or more predetermined intervals while in the warning state; and
exiting the warning state when the suspension of the user's ability to enter input has ended.

7. The method of claim 4, further comprising:
exiting the warning state when another predetermined threshold is not met during a different predetermined interval while in the warning state; and
exiting the warning state when the suspension of the user's ability to enter input has ended.

8. The method of claim 1, wherein the transmitting of the warning comprises at least one of:
playing an audible warning; and
displaying a warning message to the user.

9. An apparatus comprising:
a keyboard for receiving user input;
a keyboard controller for receiving the key input from the keyboard;
a text application for receiving the key input from the keyboard controller and for performing predetermined actions based on the key input;
an alarm monitor for monitoring input received from at least one of the keyboard controller and the text application over a plurality of predetermined intervals, for determining whether the amount of input over one or more of the plurality of predetermined intervals has exceeded a corresponding one of a plurality of predetermined thresholds, and for transmitting a warning to the user when the amount of input over the one or more predetermined intervals has exceeded the corresponding predetermined threshold; and
a display unit for displaying a user interface of the text application and for displaying the warning when the warning is a message to be displayed on the display unit.

10. The apparatus of claim 9, wherein the alarm monitor monitors at least one of:
key input received from the keyboard controller, and
input transmitted to the alarm monitor from the text application.

11. The apparatus of claim 9, wherein the plurality of intervals comprises a first interval of one minute and a second interval of one hour, and
wherein the plurality of thresholds comprises a first threshold of sixty characters corresponding to the first interval and a second threshold of six hundred characters corresponding to the second interval.

12. The apparatus of claim 9, wherein the alarm monitor enters into a warning state when the amount of input over the one or more predetermined intervals has exceeded the corresponding predetermined threshold, and
when a predetermined number of warnings has been sent while the alarm monitor is in the warning state, the alarm monitor transmits a critical alert and suspends the ability of the user to enter input for a predetermined time period.

13. The apparatus of claim 12, wherein the alarm monitor displays a message to the user indicating that the ability of enter input has been suspended and when the ability of the user to enter input will be restored.

14. The apparatus of claim 12, wherein the alarm monitor exits the warning state when at least one of the following conditions occur:
when the corresponding predetermined threshold is not met during the one or more predetermined intervals while the alarm monitor is in the warning state;
when the predetermined threshold is not met during a different predetermined interval while alarm monitor is in the warning state; and
when the suspension of the user's ability to enter input has ended.

15. The apparatus of claim 12, wherein, when the alarm monitor suspends the ability of the user to enter input, the alarm monitor performs at least one of:
instructing the text application not to respond to input received from the keyboard controller;
instructing the keyboard controller not to transmit key input received from the keyboard to the text application; and
when the keyboard is a soft keyboard displayed on the display unit, preventing the keyboard from being displayed on the display unit.

16. The apparatus of claim 9, wherein the warning comprises at least one of an audible warning played over a speaker of the apparatus and the message displayed on the display unit.

17. The apparatus of claim 9, wherein the keyboard comprises at least one of:
a soft keyboard displayed on the display unit, wherein the display unit is a touchscreen;
a physical component of the apparatus; and
a peripheral component connectable to the apparatus.

* * * * *